United States Patent
O'Neill et al.

(10) Patent No.: US 12,431,731 B2
(45) Date of Patent: Sep. 30, 2025

(54) MICROINVERTERS FOR PHOTOVOLTAIC APPLICATIONS

(71) Applicant: Enphase Energy, Inc., Petaluma, CA (US)

(72) Inventors: Daniel John O'Neill, Christchurch (NZ); Bonny Antony, Canterbury (NZ)

(73) Assignee: Enphase Energy, Inc., Petaluma, CA (US)

( * ) Notice: Subject to any disclaimer, the term of this patent is extended or adjusted under 35 U.S.C. 154(b) by 0 days.

(21) Appl. No.: 18/784,209

(22) Filed: Jul. 25, 2024

(65) Prior Publication Data

US 2025/0055307 A1 Feb. 13, 2025

Related U.S. Application Data

(60) Provisional application No. 63/531,422, filed on Aug. 8, 2023.

(51) Int. Cl.
| | |
|---|---|
| H02J 7/35 | (2006.01) |
| H02J 3/00 | (2006.01) |
| H02J 3/14 | (2006.01) |
| H02J 3/38 | (2006.01) |
| H02J 7/00 | (2006.01) |
| H02S 40/32 | (2014.01) |
| H02S 50/00 | (2014.01) |

(52) U.S. Cl.
CPC ............ *H02J 7/35* (2013.01); *H02J 3/003* (2020.01); *H02J 3/14* (2013.01); *H02J 3/381* (2013.01); *H02J 7/00041* (2020.01); *H02S 40/32* (2014.12); *H02S 50/00* (2013.01); *H02J 2300/24* (2020.01)

(58) Field of Classification Search
CPC ...... H02J 7/35; H02J 3/00; H02J 3/003; H02J 7/00; H02J 7/00041; H02J 3/14; H02J 3/38; H02J 3/381; H02J 2300/24; H02S 40/12; H02S 50/00
See application file for complete search history.

(56) References Cited

U.S. PATENT DOCUMENTS

2019/0312547 A1† 10/2019 Azad
2021/0050725 A1† 2/2021 Jensen

FOREIGN PATENT DOCUMENTS

CN 115657782 A † 1/2023
EP 4050125 A1 † 8/2022

† cited by third party

*Primary Examiner* — Robert L Deberadinis
(74) *Attorney, Agent, or Firm* — Moser Taboada (57) ABSTRACT

A method for predicting an available power in an energy management system is provided herein and comprises querying a power conditioning unit (PCU) connected to a load in the energy management system for power conditioning unit (PCU) data, receiving the power conditioning unit (PCU) data from the power conditioning unit (PCU) at a controller of the energy management system, and predicting an available unused power of a photovoltaic in a photovoltaic system (PV) based on the power conditioning unit (PCU) data.

18 Claims, 5 Drawing Sheets

MICROINVERTERS FOR PHOTOVOLTAIC APPLICATIONS

CROSS-REFERENCE TO RELATED APPLICATIONS

The present application claims the benefit of and priority to U.S. Provisional Application Ser. No. 63/531,422, filed on Aug. 8, 2023, the entire contents of which is incorporated herein by reference.

BACKGROUND

Field of the Disclosure

Embodiments of the present disclosure relate generally to power conversion systems, and for example, to microinverters that are configured to predict an available power when a photovoltaic system is off-grid (or not in maximum power point tracking (MPPT) when on grid) and make smart decisions about load control.

Description of the Related Art

Power converters (microinverters) play an indispensable role in various electrical power applications, such as converting DC from renewable energy resources to power-grid compliant AC. Topologies for the power converters are designed with various considerations, including cost and efficiency. For example, in a situation where in an off-grid PV system (or not in MPPT when on grid), a user does not know how much power is available when the power converters are not in MPPT. For example, when the PV system is off-grid (or not in MPPT when on grid), the PV system is not configured to predict an available power, and, therefore, the PV system cannot make smart decisions about load control. Accordingly, without being able to predict the available power, the off-grid PV systems (or not in MPPT when on grid) are not utilizing the full available PV power.

Therefore, there is a need in the art for improved microinverters that are configured to predict an available power when the photovoltaic system is off-grid (or not in MPPT when on grid) and make smart decisions about load control.

SUMMARY

In accordance with at least some aspects of the disclosure, a method for predicting an available power in an energy management system comprises querying a power conditioning unit (PCU) connected to a load in the energy management system for power conditioning unit (PCU) data, receiving the power conditioning unit (PCU) data from the power conditioning unit (PCU) at a controller of the energy management system, and predicting an available unused power of a photovoltaic in a photovoltaic system (PV) based on the power conditioning unit (PCU) data.

In accordance with at least some aspects of the disclosure, a non-transitory computer readable storage medium has instructions stored thereon that when executed by a process performs a method for predicting an available power in an energy management system. The method comprises querying a power conditioning unit (PCU) connected to a load in the energy management system for power conditioning unit (PCU) data, receiving the power conditioning unit (PCU) data from the power conditioning unit (PCU) at a controller of the energy management system, and predicting an available unused power of a photovoltaic in a photovoltaic system (PV) based on the power conditioning unit (PCU) data.

In accordance with at least some aspects of the disclosure, an energy management system comprises a power conditioning unit connected to a load in the energy management system and a controller connected to the power conditioning unit and the load and configured to query the power conditioning unit (PCU) for power conditioning unit (PCU) data, receive the power conditioning unit (PCU) data from the power conditioning unit (PCU), and predict an available unused power of a photovoltaic in a photovoltaic system (PV) based on the power conditioning unit (PCU) data.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Methods and apparatus described herein provide improved microinverters that are configured to predict an available power when the photovoltaic system is off-grid (or not in MPPT when on grid) and make smart decisions about load control. For example, a method for predicting an available power in an energy management system can comprise querying a power conditioning unit (PCU) connected to a load in the energy management system for power conditioning unit (PCU) data. Next, the method can comprise receiving the power conditioning unit (PCU) data from the power conditioning unit (PCU) at a controller of the energy management system. Next, the method can comprise predicting an available unused power of a photovoltaic in a photovoltaic system (PV) based on the power conditioning unit (PCU) data. The methods and apparatus described herein use a predicted available power to allow a home energy management system (HEMS) solution to maximize power usage without compromising system stability. Moreover, the methods and apparatus described herein provide a user with a better off-grid (or not in MPPT when on grid) experience by allowing a user to utilize more of an available power, without having to worry about microgrid brown-outs—which is especially important in sunlight backup systems—as, typically, a user would only find out how much power is available when a microgrid brown-out occurs.

Figure 1:
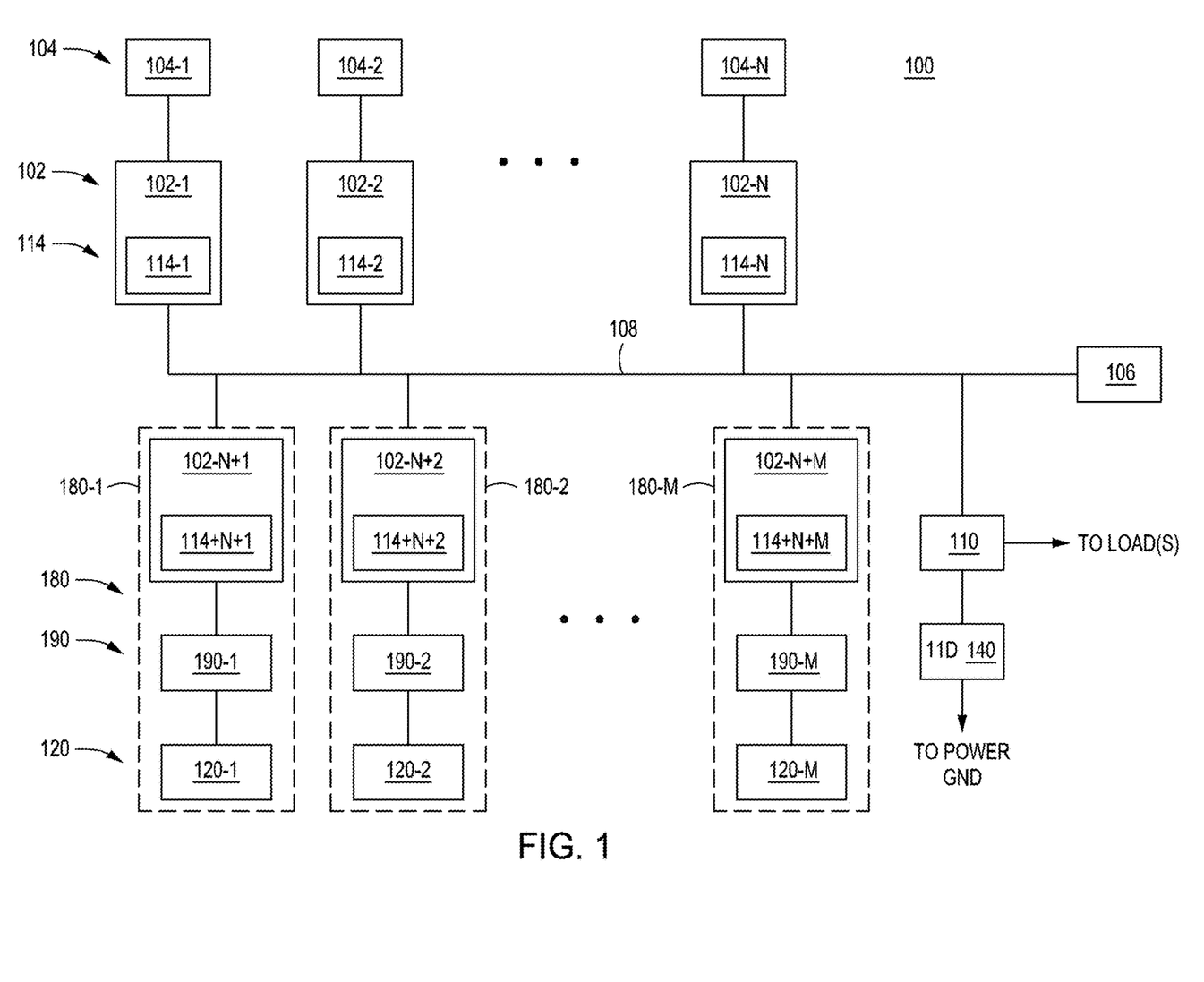
FIG. 1 is a block diagram of an energy management system, in accordance with one or more embodiments of the present disclosure.

FIG. 1 is a block diagram of a system 100 (energy management system) for power conversion using one or more embodiments of the present disclosure. This diagram only portrays one variation of the myriad of possible system configurations and devices that may utilize the present disclosure.

The system 100 is a microgrid that can operate in both an islanded state (off-grid state (or not in MPPT when on grid)) and in a grid-connected state (i.e., when connected to another power grid (such as one or more other microgrids and/or a commercial power grid). The system 100 comprises a plurality of power converters 102-1, 102-2, ... 102-N, 102-N+1, and 102-N+M collectively referred to as power converters 102 (which also may be called power conditioner units); a plurality of DC power sources 104-1, 104-2, ... 104-N, collectively referred to as DC power sources 104 (e.g., resources); a plurality of energy storage devices/delivery devices 120-1, 120-2, ... 120-M collectively referred to as energy storage/delivery devices 120; a system controller 106; a plurality of BMUs 190-1, 190-2, ... 190-M (battery management units) collectively referred to as BMUs 190; a system controller 106; a bus 108; a load center 110; and an IID 140 (island interconnect device) (which may also be referred to as a microgrid interconnect device (MID)). In some embodiments, the energy storage/delivery devices are rechargeable batteries (e.g., multi-C-rate collection of AC batteries) which may be referred to as batteries 120, although in other embodiments the energy storage/delivery devices may be any other suitable device for storing energy and providing the stored energy. Generally, each of the batteries 120 comprises a plurality cells that are coupled in series, e.g., eight cells coupled in series to form a battery.

Each power converter 102-1, 102-2 ... 102-N is coupled to a DC power source 104-1, 104-2 ... 104-N, respectively, in a one-to-one correspondence, although in some other embodiments multiple DC power sources may be coupled to one or more of the power converters 102. The power converters 102-N+1, 102-N+2 ... 102-N+M are respectively coupled to plurality of energy storage devices/delivery devices 120-1, 120-2 ... 120-M via BMUs 190-1, 190-2 ... 190-M to form AC batteries 180-1, 180-2 ... 180-M, respectively. Each of the power converters 102-1, 102-2 ... 102-N+M comprises a corresponding controller 114-1, 114-2 ... 114-N+M (collectively referred to as the controller 114) for controlling operation of the power converters 102-1, 102-2 ... 102-N+M.

In some embodiments, such as the embodiment described below, the DC power sources 104 are DC power sources and the power converters 102 are bidirectional inverters such that the power converters 102-1 ... 102-N convert DC power from the DC power sources 104 to grid-compliant AC power that is coupled to the bus 108, and the power converters 102-N+1 ... 102-N+M convert (during energy storage device discharge) DC power from the batteries 120 to grid-compliant AC power that is coupled to the bus 108 and also convert (during energy storage device charging) AC power from the bus 108 to DC output that is stored in the batteries 120 for subsequent use. The DC power sources 104 may be any suitable DC source, such as an output from a previous power conversion stage, a battery, a renewable energy source (e.g., a solar panel or photovoltaic (PV) module (solar cells), a wind turbine, a hydroelectric system, or similar renewable energy source), or the like, for providing DC power. In other embodiments the power converters 102 may be other types of converters (such as DC-DC converters), and the bus 108 is a DC power bus. In at least some embodiments, such as when the DC power sources 104 are an array of photovoltaic modules, the array of photovoltaic modules and corresponding the power converters can be referred to as a photovoltaic system.

The power converters 102 are coupled to the system controller 106 via the bus 108 (which also may be referred to as an AC line or a grid). The system controller 106 generally comprises a CPU coupled to each of support circuits and a memory that comprises a system control module for controlling some operational aspects of the system 100 and/or monitoring the system 100 (e.g., issuing certain command and control instructions to one or more of the power converters 102, collecting data related to the performance of the power converters 102, and the like). The system controller 106 is capable of communicating with the power converters 102 by wireless and/or wired communication (e.g., power line communication) for providing certain operative control and/or monitoring of the power converters 102.

In some embodiments, the system controller 106 may be a gateway that receives data (e.g., performance data, MPPT data, etc.) from the power converters 102 and communicates (e.g., via the Internet) the data and/or other information to a remote device or system, such as a master controller (not shown). Additionally (or alternatively), the gateway may receive information from a remote device or system (not shown) and may communicate the information to the power converters 102 and/or use the information to generate control commands that are issued to the power converters 102.

The power converters 102 are coupled to the load center 110 via the bus 108, and the load center 110 is coupled to the power grid via the IID 140. When coupled to the power grid (e.g., a commercial grid or a larger microgrid) via the IID 140, the system 100 may be referred to as grid-connected; when disconnected from the power grid via the IID 140, the system 100 may be referred to as islanded. The IID 140 determines when to disconnect from/connect to the power grid (e.g., the IID 140 may detect a grid fluctuation, disturbance, outage or the like) and performs the disconnection/connection. Once disconnected from the power grid (off-grid (or not in MPPT when on grid)), the system 100 can continue to generate power as an intentional island, without imposing safety risks on any line workers that may be working on the grid, using one or more conventional droop control techniques. The IID 140 comprises a disconnect component (e.g., a disconnect relay) for physically disconnecting/connecting the system 100 from/to the power grid. In some embodiments, the IID 140 may additionally comprise an autoformer for coupling the system 100 to a split-phase load that may have a misbalance in it with some neutral current. In certain embodiments, the system controller 106 comprises the IID 140 or a portion of the IID 140.

The power converters 102 convert the DC power from the DC power sources 104 and discharge the batteries 120 to grid-compliant AC power and couple the generated output power to the load center 110 via the bus 108. The power is then distributed to one or more loads (for example to one or more appliances) and/or to the power grid (when connected to the power grid). Additionally (or alternatively), the generated energy may be stored for later use, for example using batteries, heated water, hydro pumping, $H_2O$-to-hydrogen conversion, or the like. Generally, the system 100 is coupled to the commercial power grid, although in some embodiments the system 100 is completely separate from the commercial grid and operates as an independent microgrid.

In some embodiments, the AC power generated by the power converters 102 is single-phase AC power. In other embodiments, the power converters 102 generate three-phase AC power.

Figure 2:
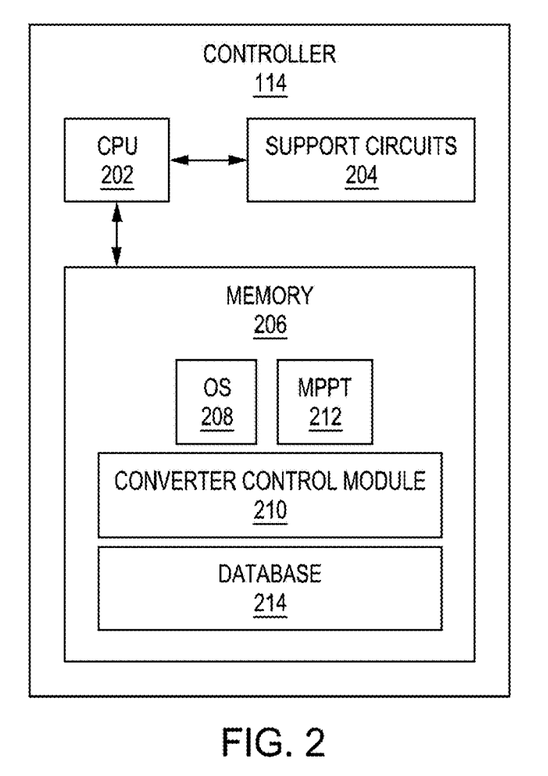
FIG. 2 is a block diagram of a controller, in accordance with one or more embodiments of the present disclosure.

FIG. 2 is a block diagram of the controller 114 in accordance with one or more embodiments of the present disclosure. The controller 114 comprises support circuits 204 and a memory 206, each coupled to a CPU 202 (central processing unit). The CPU 202 may comprise one or more conventionally available microprocessors or microcontrollers. Alternatively, the CPU 202 may include one or more application specific integrated circuits (ASICs). In other embodiments, the CPU 202 may be a microcontroller comprising internal memory for storing controller firmware that, when executed, provides the controller functionality described herein.

The support circuits 204 are well known circuits used to promote functionality of the CPU 202. Such circuits include, but are not limited to, a cache, power supplies, clock circuits, buses, input/output (I/O) circuits, and the like. The controller 114 may be implemented using a general-purpose computer that, when executing particular software, becomes a specific purpose computer for performing various embodiments of the present disclosure.

The memory 206 may comprise random access memory, read only memory, removable disk memory, flash memory, and various combinations of these types of memory. The memory 206 is sometimes referred to as main memory and may, in part, be used as cache memory or buffer memory. The memory 206 generally stores the OS 208 (operating system), if necessary, of the controller 114 that can be supported by the CPU capabilities. In some embodiments, the OS 208 may be one of a number of commercially available operating systems such as, but not limited to, LINUX, Real-Time Operating System (RTOS), and the like.

The memory 206 may store various forms of application software, such as a converter control module 210 for controlling operation of the power converter 102 when executed by the controller 114. The memory 206 may also store a database 214 for storing data related to the operation of the power converter 102.

For example, the memory 206 may further store an MPPT module 212 that, when executed by the controller 114, determines an operating point for biasing the PV module at a maximum power point (MPP). For example, the MPPT module 212 may comprise a commercially-available MPPT module for providing a global maximum power point tracking for the DC power sources 104 (PV module). For example, the MPPT module 212 algorithm determines a DC input current demand signal in order to operate the DC power sources 104 at a loading that produces a maximum output power for a given solar irradiance. For example, input and output voltages are determined by the DC power sources 104 and AC grid voltages, while a DC input current is determined by a PV MPPT algorithm used to extract a maximum power from the DC power sources 104. In at least some embodiments, the converter control module 210 is responsible for determining an AC output current to keep the capacitor voltage regulated to a target value. The MPPT module 212 may comprise control logic for performing MPP tracking. The MPPT module 212 may be implemented in software (e.g., computer-readable program code stored in memory and executed by a processor), hardware (e.g., ASIC, hardwired logic), or combination of hardware and software (e.g., firmware). The MPPT module 212 may be configured to perform a normal MPPT method, which is so named because it is configured to perform MPPT under normal operating conditions. The normal MPPT method may comprise the perturb and observe (P&O) method and the incremental conductance (IncC) method, for example. The MPPT module 212 may be configured to modify the normal MPPT method in response to detecting shading of the plurality of PV modules (solar cells) and/or when certain temporal conditions are met. The modification may involve use of another MPPT method instead of the normal MPPT method, changing a value of a variable (e.g., increment step size or decrement step size) of the normal MPPT method, performing a full I-V curve sweep, and/or other ways of changing the processing behavior, and accordingly the output, of the normal MPPT method. The MPPT module 212 may be configured to receive from a solar tracker controller position information indicative of orientation of the plurality of PV modules relative to solar illumination.

The MPPT module 212 is implemented in a microinverter and reads the voltage and current of the plurality of PV modules, performs MPPT using the voltage and current levels of the plurality of PV modules to determine a voltage setpoint in the form of a voltage reference $V_{ref}$ and provides the voltage reference $V_{ref}$ to the inverter circuits. The inverter circuits change the impedance presented to the plurality of PV modules, or perform other actions depending on the inverter, to induce the plurality of PV modules to generate a voltage at a same level as the reference voltage $V_{ref}$. It is to be noted that the reference voltage $V_{ref}$ serves as a setpoint, but the actual voltage operating point of the photovoltaic system may differ from the reference voltage $V_{ref}$. As can be appreciated, the functionality of the MPPT module 212 may also be implemented in a device other than a photovoltaic inverter.

Figure 3:
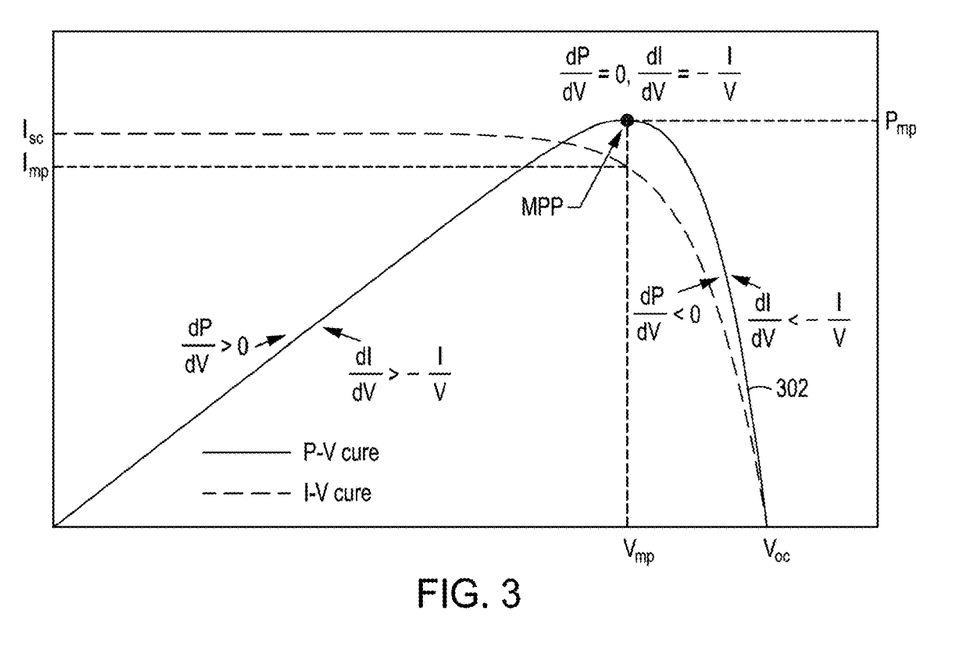
FIG. 3 is a diagram of a power-voltage curve and a current-voltage curve, in accordance with one or more embodiments of the present disclosure.
Figure 4:
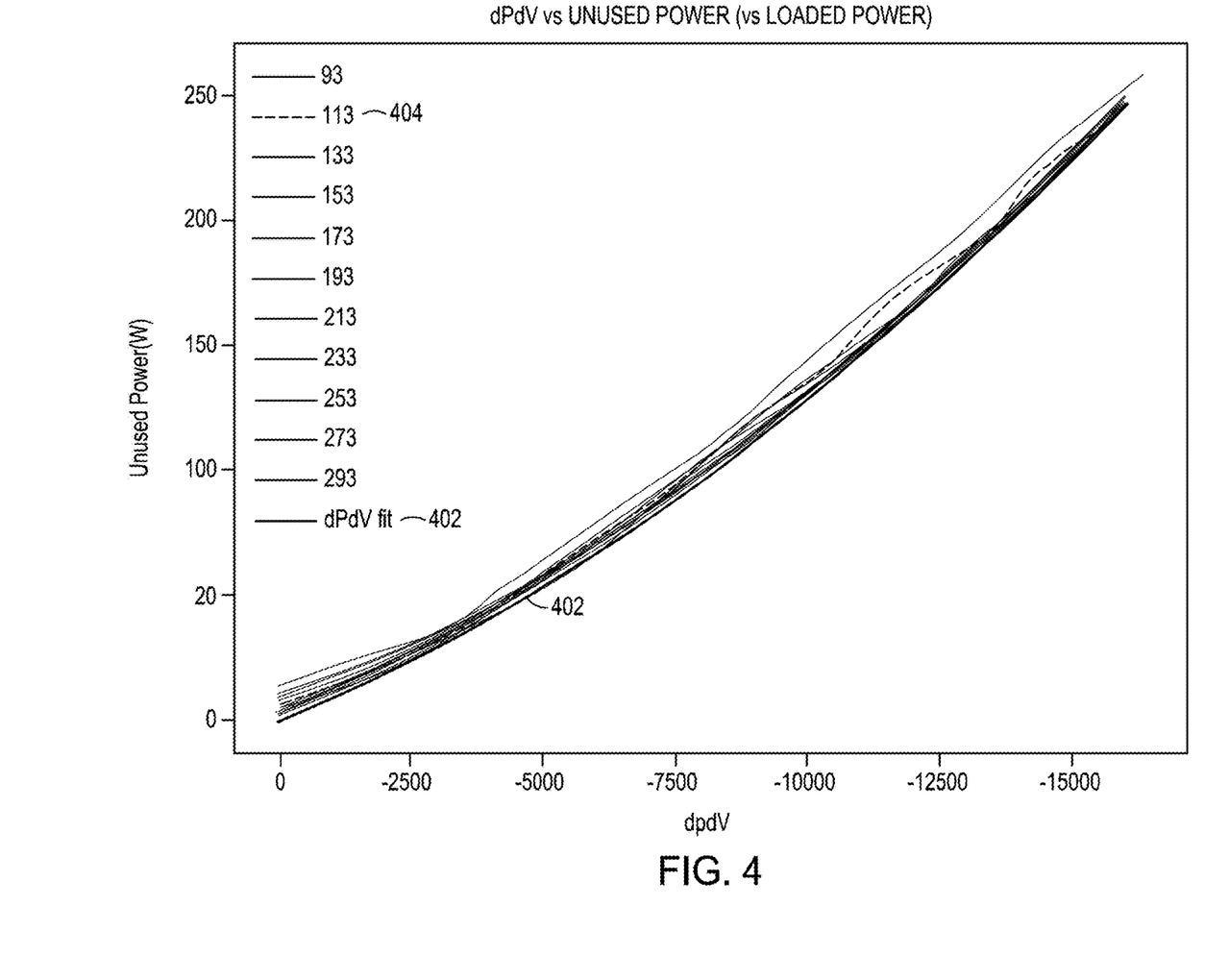
FIG. 4 is a graph of unused power vs. dP/dV for a plurality of microinverters, in accordance with one or more embodiments of the present disclosure.

The inventors have found that when the MPPT module 212 (e.g., part of the PV system) is not performing MPPT (i.e., off-grid with sunlight only backup or when a battery is full (or not in MPPT when on grid)), informing a user how much power is available would be useful. Accordingly, a method that uses an estimate of MPPT that is calculated using collected PCU data is described herein. For example, in at least some embodiments, the method can use an estimate of MPPT obtained from a multivariable polynomial equation and/or machine learning algorithm. Alternatively or additionally, the method can use an estimate of MPPT from a multi-dimensional look up table (LUT) comprising previously collected PCU data that can be correlated to an estimate/prediction of unused PV power. In either embodiment, dP/dV (e.g., assumed linear, see 302 of FIG. 3 for example) data, power level (P) data, and Udc date can be used to provide a correlation with unused power (estimated). For example, as illustrated in FIG. 4, unused power vs. dP/dV shows a relatively good linear behavior with a zero intercept. For example, in FIG. 4 unused power vs. dP/dV data is shown for one microinverter with different loads e.g., the orange trace (404) is loaded with 113 W and the dP/pV is plotted against the unused power of the connected SAS (solar array simulator).

In at least some embodiments, collected PCU operating data over different loads and irradiance conditions can be collected during normal operation reducing power from the MPPT point, and a dP/dV fit 402 can be calculated, and, in some embodiments, stored in a LUT. For example, in at least some embodiments, a multivariable polynomial fit of the collected PCU operating data can be used to generate an estimated power based on the collected PCU operating data. The estimated power can be used by the controller (e.g., the system controller 106 and/or the controller 114) to predict/ estimate an unused available power during operation. For example, during operation, a controller (e.g., the system controller 106 and/or the controller 114) can query a PCU for dP/dV data, power (P) data, and Udc data in a loop (closed loop) and an estimate of available power can be calculated. For example, a controller of a PCU can provide the dP/dV data, power (P) data, and Udc data to the system controller, which, in turn, can calculate the slope of the dP/dV, and correlate the slope of the dP/dV to an available unused power.

As noted above, in at least some embodiments, a machine learning algorithm (e.g., slow running learning filter) can be used. For example, in at least some embodiments dP/dV can be input to the machine learning algorithm (and/or one or more calculations). In such embodiments, filtering and/or slope finding is not required as the filtering and/or slope finding can be output from the MPPT module 212, even when not in MPPT.

In at least some embodiments, an offset between the curves, e.g., due to loss in the PV and/or the AC cables, can be accounted for during the slope calculation. For example, each of the controllers and/or the PCUs can include a predetermined value that corresponds to the loss in the PV and/or the AC cables and the predetermined value can be transmitted to the system controller when queried for data by the system controller.

Figure 5:
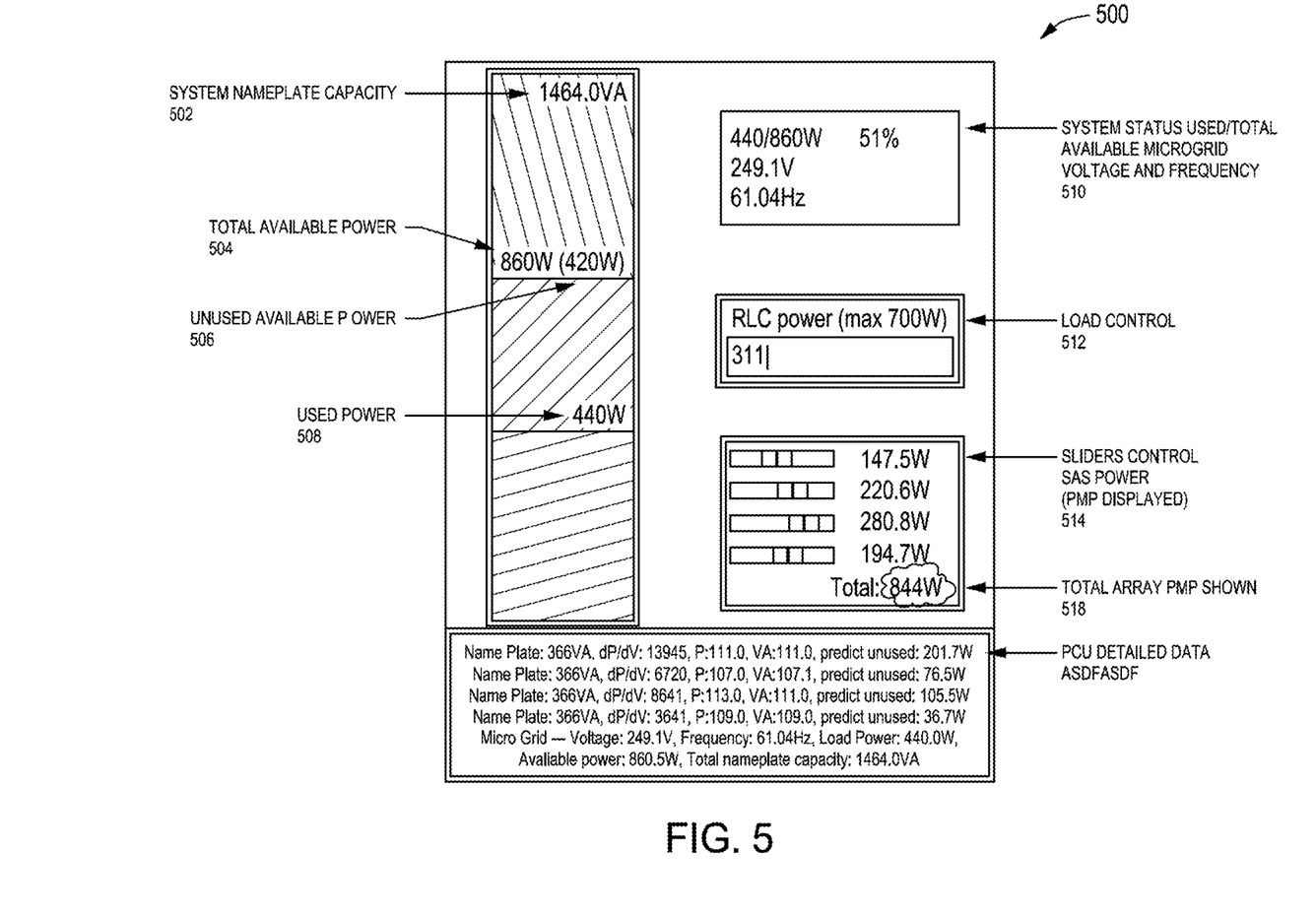
FIG. 5 is a diagram of a graphical user interface, in accordance with one or more embodiments of the present disclosure.

FIG. 5 is a diagram of a graphical user interface 500, in accordance with one or more embodiments of the present disclosure. For example, the graphical user interface 500 can comprise a system nameplate capacity indicator 502, which illustrates the total capacity of a PV system in VA. The graphical user interface 500 can comprise a total available power indicator 504, which illustrates a total available power of the PV system in W, and an unused available power indicator 506, which illustrates an unused available power of the PV system in W. The graphical user interface 500 can comprise a used power indicator 508, which illustrates a used power of the PV system in W. The graphical user interface 500 can comprise a system status indicator 510, which illustrates a used/total available power in W, and a microgrid voltage and frequency in V and Hz. The graphical user interface 500 can comprise a load control indicator 512, which illustrates an RLC (controllable resistive, inductive and capacitive load) power of the loads of the system 100 and a maximum power of the loads in the system 100 (e.g., max power in W). The graphical user interface 500 can comprise one or more slider controls 514, which illustrate an amount of power that is being generated by the each of the PVs (in W) and allow a user to control operation of each of the PVs. The graphical user interface 500 can comprise a Pmp indicator 516 (total array power maximum), which illustrates a total array power in W. The graphical user interface 500 can comprise PCU detailed data indicator 518, which can illustrate a summary of information of one or more of the other indicators 502-516. For example, the PCU detailed data indicator 518 can comprise name plate information, dP/dV information, power information, VA information, and a prediction of unused available power for each of the PVs in the PV system.

Figure 6:
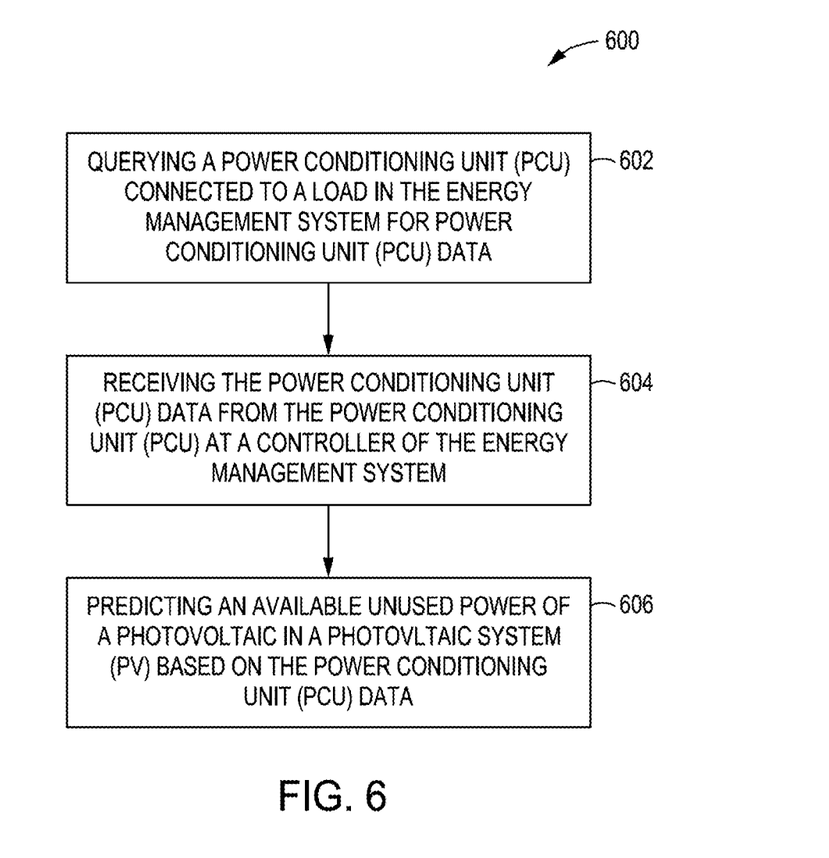
FIG. 6 is a flowchart of a method for predicting an available power when a photovoltaic system is off-grid (or not in MPPT when on grid), in accordance with one or more embodiments of the present disclosure.

FIG. 6 is a flowchart of a method 600 for predicting an available power when a photovoltaic system is off-grid (or not in MPPT when on grid), in accordance with one or more embodiments of the present disclosure. For example, at 602, the method 600, can comprise querying a PCU for dP/dV data, power (P) data, and Udc data. For example, a controller can query an MPPT module (e.g., MPPT module 212) of a PV in the plurality of PVs. In at least some embodiments, the system controller 106 can query the controller 114 of a PV to provide the relevant data to the system controller. For example, the controller 114 can communicate with the MPPT module 212 for the relevant data. Additionally, at 602, the method 600 can comprise communicating to remaining PVs of the plurality of PVs a command not to provide PCU for dP/dV data, power (P) data, and Udc data. For example, during 602, the system controller 106 can communicate a command to the other controllers of the remaining PVs not to transmit the dP/dV data, power (P) data, and Udc data.

Next, at 604, the method 600 can comprise receiving the dP/dV data, power (P) data, and Udc data at the system controller. In at least some embodiments, the controller of the PCU can provide the dP/dV data, power (P) data, and Udc data (e.g., which is the PV DC voltage) to the system controller, which, in turn, can calculate the slope of the dP/dV. For example, the system controller can use the multi-variable polynomial fit of the collected the dP/dV data, power (P) data, and Udc data to calculate the slope of the dP/dV.

Once the slope of the dP/dV is calculated, at 606, the method 600 cam comprise predicting an available unused power of a PV in a PV system based on the PCU data. For example, the system controller can use the calculated dP/dV to predict an available unused power of photovoltaic system. Alternatively or additionally, the controller of the PCU can use the dP/dV data, power (P) data, and Udc data to calculate the slope of the dP/dV and transmit the calculated slope to the system controller, which, in turn, can then predict an available unused power of photovoltaic system.

In at least some embodiments, the PCU can provide the dP/dV data, power (P) data, and Udc data to the system controller, which, in turn, can calculate the slope of the dP/dV, and compare/correlate the slope of the dP/dV to a predicted/estimated unused power previously determined and stored in a LUT, which can be stored in a memory (e.g., the memory 206) and accessible by and/or communicatively coupled to the system controller 106.

Next, the method 600 can comprise transmitting a predicted unused available power value to a user. For example, system controller 106 can transmit the predicted unused available power value to a user via the graphical user interface 500, which can be displayed on one or more electronic devices, e.g., smart phone, laptop, PC, etc. For example, the RLC and SAS control the available power and the load on the system 100 (via the load control indicator 512 and the one or more slider controls 514). For example, in the illustrated embodiment, the RLC can be 311 W and the maximum power of the loads can be 700 W. The reported Pmp (the Pmp indicator 516) is the maximum power available from the SAS (e.g., 844 W). The Pmp 844 W minus the load power 311 W illustrates how well the actual available power matches the estimate. The predicted unused available power value can also be stored on a server for viewing by a user.

Next, the method 600 can comprise repeating 602-606 for each of the PVs in the PV system.

The methods and apparatus can be used with other types of power converters. For example, in at least some embodiments, the methods and apparatus can be used with string inverters. In such embodiments, one or more modifications may need to be made to methods and apparatus to accommodate the string inverters, e.g., sing inverters that use optimizers.

While the foregoing is directed to embodiments of the present disclosure, other and further embodiments of the disclosure may be devised without departing from the basic scope thereof.

What is claimed is:

1. A method for predicting an available power in an energy management system, comprising:
    querying a power conditioning unit (PCU) connected to a load in the energy management system for power conditioning unit (PCU) data;
    receiving the power conditioning unit (PCU) data from the power conditioning unit (PCU) at a controller of the energy management system; and
    predicting an available unused power of a photovoltaic in a photovoltaic system (PV) based on the power conditioning unit (PCU) data.

2. The method of claim 1, further comprising transmitting a predicted available unused power of the photovoltaic to a user using a graphical user interface.

3. The method of claim 2, wherein the graphical user interface comprises at least one of:
    a system nameplate capacity indicator, which illustrates a total capacity of the photovoltaic system (PV) in VA;
    a total available power indicator, which illustrates a total available power of the photovoltaic system (PV) in W, and an available unused power indicator, which illustrates the available unused power of the photovoltaic system (PV) in W;
    a used power indicator, which illustrates a used power of the photovoltaic system (PV) in W;
    a system status indicator, which illustrates an available used/total power in W, and a microgrid voltage and frequency in V and Hz;
    a load control indicator, which illustrates an RLC (controllable resistive, inductive and capacitive load) power of the load in W and a maximum power of the load in W;
    one or more slider controls, which illustrate an amount of power that is being generated by the each of the PVs (in W) and allow the user to control operation of each PV in the photovoltaic system (PV);
    a total array Pmp (power maximum) indicator, which illustrates a total array power in W; or
    PCU detailed data indicator, which can illustrate a summary of information of the graphical user interface.

4. The method of claim 1, wherein predicting the available unused power of the photovoltaic comprises calculating a slope of the power conditioning unit (PCU) data using a multivariable polynomial equation.

5. The method of claim 1, wherein predicting the available unused power of the photovoltaic comprises inputting a slope of the power conditioning unit (PCU) data to a machine learning algorithm.

6. The method of claim 1, wherein the power conditioning unit (PCU) data comprises at least one of dP/dV data, power (P) data, and Udc data.

7. A non-transitory computer readable storage medium having instructions stored thereon that when executed by a process performs a method for predicting an available power in an energy management system, comprising:
    querying a power conditioning unit (PCU) connected to a load in the energy management system for power conditioning unit (PCU) data;
    receiving the power conditioning unit (PCU) data from the power conditioning unit (PCU) at a controller of the energy management system; and
    predicting an available unused power of a photovoltaic in a photovoltaic system (PV) based on the power conditioning unit (PCU) data.

8. The non-transitory computer readable storage medium of claim 7, further comprising transmitting a predicted available unused power of the photovoltaic to a user using a graphical user interface.

9. The non-transitory computer readable storage medium of claim 8, wherein the graphical user interface comprises at least one of:
    a system nameplate capacity indicator, which illustrates a total capacity of the photovoltaic system (PV) in VA;
    a total available power indicator, which illustrates a total available power of the photovoltaic system (PV) in W, and an available unused power indicator, which illustrates the available unused power of the photovoltaic system (PV) in W;
    a used power indicator, which illustrates a used power of the photovoltaic system (PV) in W;
    a system status indicator, which illustrates an available used/total power in W, and a microgrid voltage and frequency in V and Hz;
    a load control indicator, which illustrates an RLC (controllable resistive, inductive and capacitive load) power of the load in W and a maximum power of the load in W;
    one or more slider controls, which illustrate an amount of power that is being generated by the each of the PVs (in W) and allow the user to control operation of each PV in the photovoltaic system (PV);
    a total array Pmp (power maximum) indicator, which illustrates a total array power in W; or
    PCU detailed data indicator, which can illustrate a summary of information of the graphical user interface.

10. The non-transitory computer readable storage medium of claim 7, wherein predicting the available unused power of the photovoltaic comprises calculating a slope of the power conditioning unit (PCU) data using a multivariable polynomial equation.

11. The non-transitory computer readable storage medium of claim 7, wherein predicting the available unused power of the photovoltaic comprises inputting a slope of the power conditioning unit (PCU) data to a machine learning algorithm.

12. The non-transitory computer readable storage medium of claim 7, wherein the power conditioning unit (PCU) data comprises at least one of dP/dV data, power (P) data, and Udc data.

13. An energy management system, comprising:
    a power conditioning unit connected to a load in the energy management system; and
    a controller connected to the power conditioning unit and the load and configured to:
    query the power conditioning unit (PCU) for power conditioning unit (PCU) data;
    receive the power conditioning unit (PCU) data from the power conditioning unit (PCU); and
    predict an available unused power of a photovoltaic in a photovoltaic system (PV) based on the power conditioning unit (PCU) data.

14. The energy management system of claim 13, wherein the controller is further configured to transmit a predicted available unused power of the photovoltaic to a user using a graphical user interface.

15. The energy management system of claim 14, wherein the graphical user interface comprises at least one of:
- a system nameplate capacity indicator, which illustrates a total capacity of the photovoltaic system (PV) in VA;
- a total available power indicator, which illustrates a total available power of the photovoltaic system (PV) in W, and an available unused power indicator, which illustrates the available unused power of the photovoltaic system (PV) in W;
- a used power indicator, which illustrates a used power of the photovoltaic system (PV) in W;
- a system status indicator, which illustrates an available used/total power in W, and a microgrid voltage and frequency in V and Hz;
- a load control indicator, which illustrates an RLC (controllable resistive, inductive and capacitive load) power of the load in W and a maximum power of the load in W;
- one or more slider controls, which illustrate an amount of power that is being generated by the each of the PVs (in W) and allow the user to control operation of each PV in the photovoltaic system (PV);
- a total array Pmp (power maximum) indicator, which illustrates a total array power in W; or
- PCU detailed data indicator, which can illustrate a summary of information of the graphical user interface.

16. The energy management system of claim 13, wherein the controller is further configured to calculate a slope of the power conditioning unit (PCU) data using a multivariable polynomial equation when predicting the available unused power of the photovoltaic comprises.

17. The energy management system of claim 13, wherein the controller is further configured to input a slope of the power conditioning unit (PCU) data to a machine learning algorithm when predicting the available unused power of the photovoltaic.

18. The energy management system of claim 13, wherein the power conditioning unit (PCU) data comprises at least one of dP/dV data, power (P) data, and Udc data.

* * * * *